United States Patent
Chung

(10) Patent No.: US 11,388,274 B2
(45) Date of Patent: Jul. 12, 2022

(54) METHOD FOR IMPLEMENTING HIGH AVAILABILITY OF BARE METAL NODE BASED ON OPENSTACK AND ELECTRONIC DEVICE USING THE SAME

(71) Applicant: HON HAI PRECISION INDUSTRY CO., LTD., New Taipei (TW)

(72) Inventor: Shuo-Yen Chung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/335,006

(22) Filed: May 31, 2021

(65) Prior Publication Data

US 2021/0377370 A1 Dec. 2, 2021

(30) Foreign Application Priority Data

Jun. 1, 2020 (CN) .......................... 202010485060.2

(51) Int. Cl.
*H04L 29/14* (2006.01)
*H04L 29/08* (2006.01)
(Continued)

(52) U.S. Cl.
CPC .............. *H04L 69/40* (2013.01); *H04L 67/10* (2013.01)

(58) Field of Classification Search
CPC ...... H04L 69/40; H04L 67/10; H04L 67/1029
(Continued)

(56) References Cited

U.S. PATENT DOCUMENTS

| 10,924,419 B1 * | 2/2021 | Chitalia | H04L 43/045 |
| 10,986,174 B1 * | 4/2021 | Sharma | H04L 41/0816 |

(Continued)

FOREIGN PATENT DOCUMENTS

| CN | 106775953 | 5/2017 |
| CN | 108132829 | 6/2018 |

(Continued)

OTHER PUBLICATIONS

Wilson Teixeira de Magalhaes Jr., "Bare metal vs. virtual machine cloud: Which option is right for me?" Jun. 2014, ibm.com, https://www.ibm.com/blogs/cloud-computing/2014/06/17/bare-metal-vs-virtual-machine-cloud-option-right/ (Year: 2014).*

(Continued)

*Primary Examiner* — Ruolei Zong
(74) *Attorney, Agent, or Firm* — ScienBiziP, P.C.

(57) ABSTRACT

A method for implementing high availability of bare metal node based on OpenStack utilizes a control node communicating through a power control network with a main bare metal node and a backup bare metal node. The control node turns on a power supply to activate an operating system image file installed in the main bare metal node. Information as to status is sent to the control node by the main bare metal node, and if the status information ceases, the control node switches off the power supply to the main bare metal node. The control node turns on a power supply to the backup bare metal node to activate the operating system image file therein and selects as subsequent backup a further bare metal node and installs activate the operating system image file therein.

14 Claims, 4 Drawing Sheets

(51) Int. Cl.
　　　*H04L 69/40*　　　(2022.01)
　　　*H04L 67/10*　　　(2022.01)
(58) Field of Classification Search
　　　USPC ........................................................ 709/230
　　　See application file for complete search history.

(56) References Cited

U.S. PATENT DOCUMENTS

| | | | |
|---|---|---|---|
| 2010/0217866 A1* | 8/2010 | Nandagopal | H04L 67/1012 |
| | | | 709/226 |
| 2013/0036324 A1* | 2/2013 | Nagasawa | G06F 11/2038 |
| | | | 714/E11.073 |
| 2019/0042424 A1* | 2/2019 | Nair | G06F 9/45533 |
| 2020/0257452 A1* | 8/2020 | Oh | G06F 3/0647 |

FOREIGN PATENT DOCUMENTS

| | | |
|---|---|---|
| CN | 109684032 | 4/2019 |
| TW | I625949 | 6/2018 |

OTHER PUBLICATIONS

Bojana Dobra, "The Definitive Guide to Bare Metal Servers for 2021", Dec. 2018, phoenixnap.com, https://phoenixnap.com/blog/what-is-bare-metal-server (Year: 2018).*

C. G. Kominos, N. Seyvet and K. Vandikas, "Bare-metal,virtual machines and containers in OpenStack," 2017 20th Conference on Innovations in Clouds, Internet and Networks (ICIN), Mar. 7-9, 2017, pp. 36-43, doi:10.1109/ICIN.2017.7899247.

* cited by examiner

METHOD FOR IMPLEMENTING HIGH AVAILABILITY OF BARE METAL NODE BASED ON OPENSTACK AND ELECTRONIC DEVICE USING THE SAME

CROSS-REFERENCE TO RELATED APPLICATIONS

This application claims priority to Chinese Patent Application No. 202010485060.2 filed on Jun. 1, 2020, the contents of which are incorporated by reference herein.

FIELD

The subject matter herein generally relates to a cloud computing in relation to OpenStack.

BACKGROUND

OpenStack is an open source cloud computing management platform that provides a simple, scalable, and standardized cloud computing management platform. As a standard for the IAS layer of cloud computing, OpenStack is widely used in various industries. However, OpenStack does not have complete availability, if there is a problem with an underlying bare metal node, the service running on the bare metal node is not automatically saved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
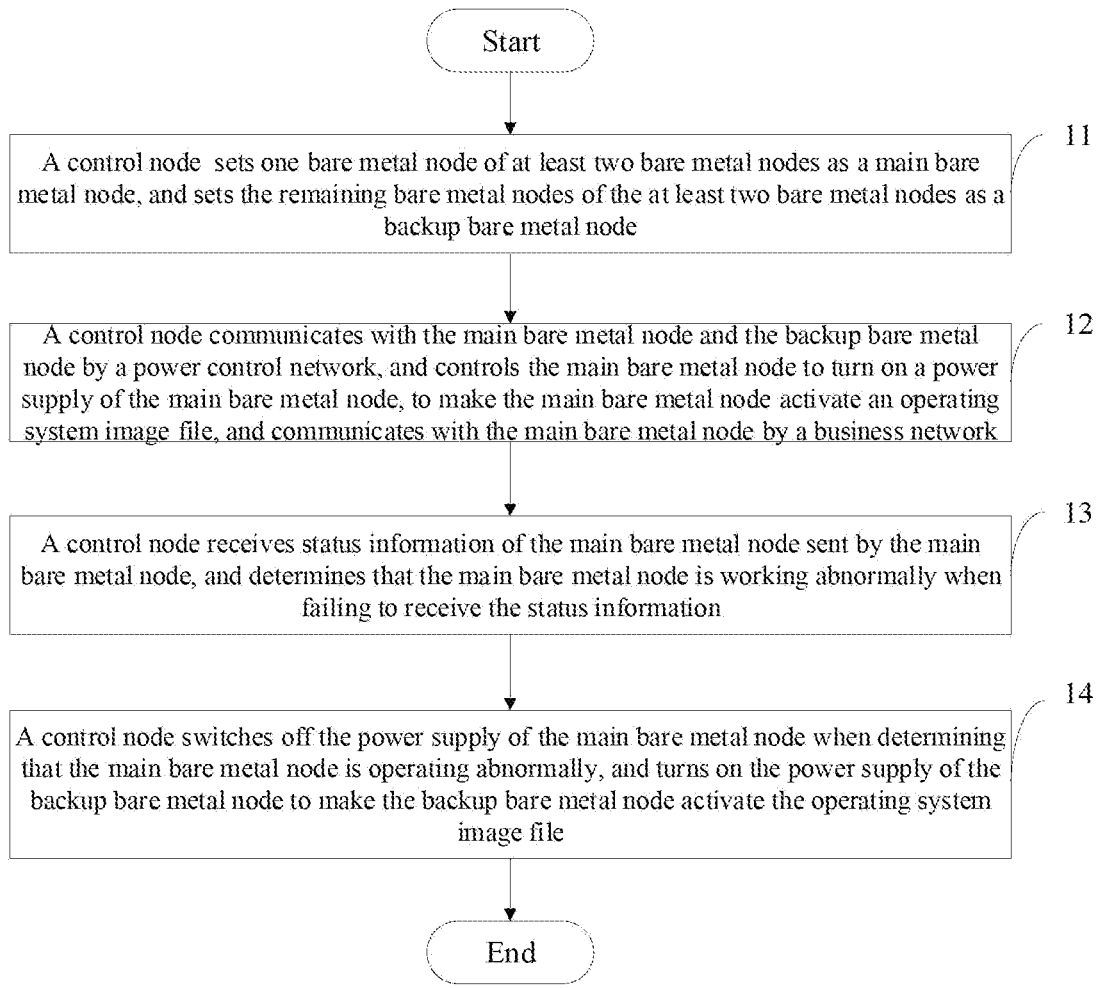
FIG. 1 is a block diagram of an embodiment of a method for implementing high availability of bare metal node based on OpenStack.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

A method for implementing high availability of bare metal node based on OpenStack is applied in an electronic device. The hardware of the electronic device includes, but is not limited to, a microprocessor, an Application Specific Integrated Circuit, a Field-Programmable Gate Array, a Signal Digital Processor, and embedded devices, etc.

Figure 2:
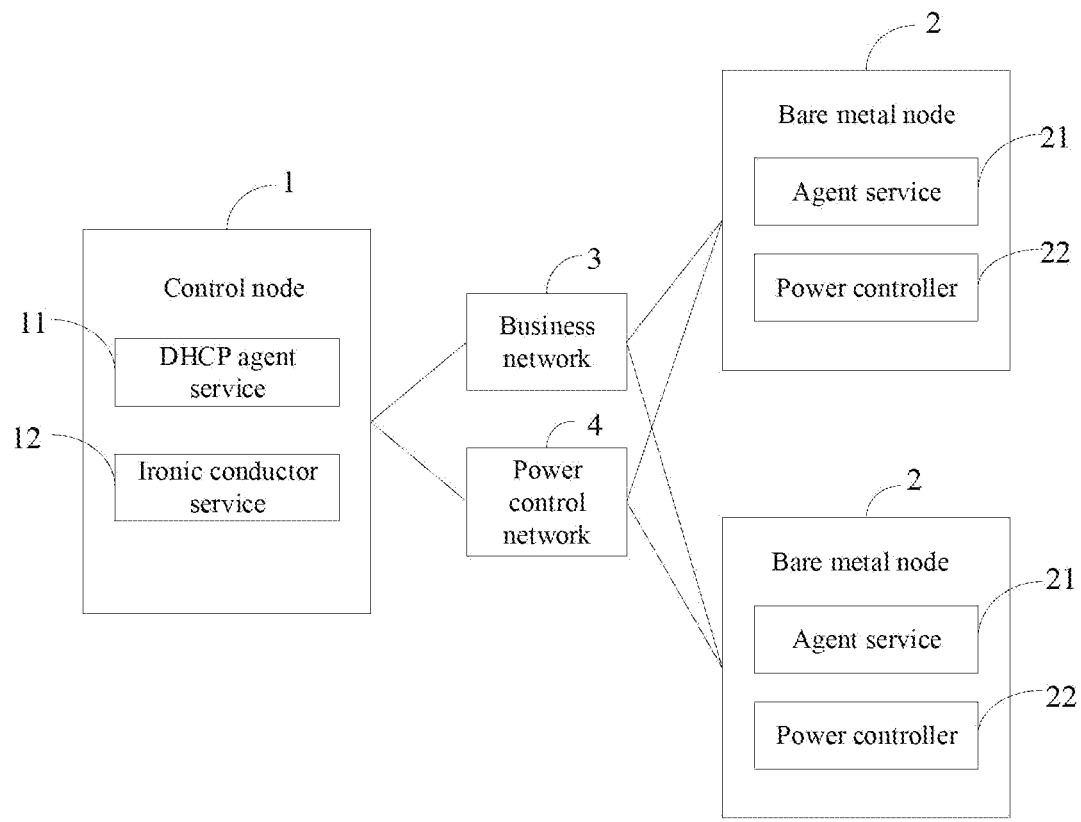
FIG. 2 is a block diagram of an embodiment of a running environment of the method of FIG. 1.

FIG. 1 illustrates a flowchart of the method. FIG. 2 illustrates a running environment of the method applied in OpenStack. The method is applied in a control node 1 and at least two bare metal nodes 2. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, a control node 1 sets one bare metal node 2 of the at least two bare metal nodes 2 as a main bare metal node, and sets the remaining bare metal nodes 2 of the at least two bare metal nodes 2 as a backup bare metal node. In one embodiment, the main bare metal node and the backup bare metal node install an operating system image file.

In one embodiment, the control node 1 includes a Dynamic Host Configuration Protocol (DHCP) agent service 11 and an Ironic conductor service 12. The bare metal node 2 includes an agent service 21 and a power controller 22. In one embodiment, the Ironic conductor service 12 of the control node 1 randomly selects a bare metal node 2 as the main bare metal node from the at least two bare metal nodes 2, and selects one or more of the remaining bare metal nodes 2 as backup bare metal nodes 2. The operating system image file is installed in the agent service 21 of the main bare metal node and in the agent service 21 of the one or more backup bare metal nodes. In one embodiment, the operating system image file includes available services. In one embodiment, the operating system image file includes image files, application files, and operating system files.

At block 12, a control node 1 communicates with the main bare metal node and the backup bare metal node by a power control network 4, and controls the main bare metal node to turn on a power supply of the main bare metal node, to make the main bare metal node activate the operating system image file, and communicates with the main bare metal node by a business network 3.

In one embodiment, the Ironic conductor service 12 of the control node 1 communicates with the power controller 22 of the main bare metal node and the backup bare metal node by the power control network 4, and controls the power controller 22 of the main bare metal node to turn on the power supply to make the agent service 21 of the main bare metal node activate the operating system image file. In one embodiment, the ionic conductor service 12 of the control node 1 controls the power controller 22 of the main bare metal node to turn on the power supply by an Intelligent Platform Management Interface (IPMI) command.

In one embodiment, the DHCP agent service 11 communicates with the agent service 21 of the main bare metal node by the business network 3. In detail, after the power supply of the main bare metal node is started, the agent service 21 of the main bare metal node sends a first request signal for requesting an IP address to the DHCP agent service 11 through the business network 3, and the first request signal includes a MAC address of the main bare metal node. The DHCP agent service 11 assigns a target IP address to the agent service 21 of the main bare metal node according to the first request signal, and records the MAC address of the main bare metal node. The DHCP agent service 11 communicates with the agent service 21 of the main bare metal node by the target IP address and the MAC address of the main bare metal node.

At block 13, a control node 1 receives status information of the main bare metal node sent by the main bare metal node. If the status information is not received, the control node 1 determines that the main bare metal node is not working or working abnormally.

In one embodiment, the agent service 21 of the main bare metal node returns the state information to the control node 1 by a heartbeat mechanism, and the DHCP agent service 11 of the control node 1 receives the status information sent by the agent service 21 of the main bare metal node. When the operating system image file of the main bare metal node is operating abnormally or if the business network 3 is disconnected, the DHCP agent service 11 does not receive the status information sent by the main bare metal node, and determines that the main bare metal node is operating abnormally when determining that the status information sent by the agent service 21 of the main bare metal node is not received.

At block 14, a control node 1 switches off the power supply of the main bare metal node when determining that the main bare metal node is operating abnormally, and turns on the power supply of the backup bare metal node to activate the operating system image file of the backup bare metal node activate the operating system image file.

In one embodiment, the control node 1 controls the power supply controller 22 of the main bare metal node to switch off the power supply of the main bare metal node by the Ironic conductor service 12. In detail, the Ironic conductor service 12 controls the power controller 22 of the main bare metal node to switch off the power supply of the main bare metal node by the IPMI command.

In one embodiment, the control node 1 controls the power controller 22 of the backup bare metal node to turn on the power supply of the backup bare metal node by the ionic conductor service 12, and receives a second request signal for requesting the IP address by the DHCP service 12 and the second request signal is sent by the agent service 21 of the backup bare metal node, and the target IP address is allocated according to the second request signal to the agent service 21 of the backup bare metal node. The MAC address of the backup bare metal node is recorded so that the agent service 21 of the backup bare metal node can communicate with the DHCP agent service 11 of the control node 1 by the business network 3. In one embodiment, the second request signal includes the MAC address of the backup bare metal node.

In one embodiment, the control node 1 sets a backup bare metal node communicating with the DHCP agent service 11 of the control node 1 as a new or replacement main bare metal node by the ionic conductor service 12, and selects an unused bare metal node from another backup bare metal node as the new backup bare metal node. The operating system image file is installed into the new backup bare metal node.

In the present disclosure, the control node 1 switches off the power supply of the main bare metal node when determining that the main bare metal node is operating abnormally, and starts the power supply of the backup bare metal node to make the backup bare metal node activate the operating system image file. Therefore, the services in the operating system image file can be continued to be executed on the backup bare metal node when the main bare metal node is operating abnormally, thus restoring the execution of services.

Figure 3:
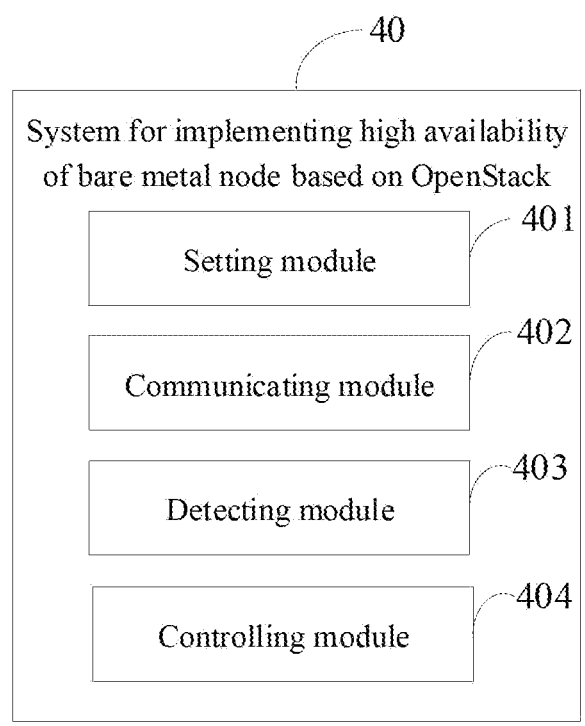
FIG. 3 is a block diagram of an embodiment of a system applying the method of FIG. 1.

FIG. 3 illustrates a system 40 for implementing high availability of bare metal node based on OpenStack. The system 40 is applied in the control node 1 and the at least two bare metal nodes 2. In one embodiment, according to the functions performed, the system 40 can be divided into a plurality of functional modules. The functional modules perform the blocks 11-14 in the embodiment of FIG. 1 to perform the functions of implementation of bare metal nodes based on OpenStack. The system 40 includes, but is not limited to, a setting module 401, a communicating module 402, a detecting module 403, and a controlling module 404. The modules 401-404 of the system 40 can be collections of software instructions. The modules in the present disclosure refer to a series of computer program segments which can be executed by at least one processor and can perform the required functions stored in memory.

The setting module 401 sets one bare metal node 2 of the at least two bare metal nodes 2 as a main bare metal node, and sets one or more of the remaining bare metal nodes 2 of the at least two bare metal nodes 2 as backup bare metal nodes. In one embodiment, the main bare metal node and the backup bare metal node receive installation of an operating system image file.

In one embodiment, the setting module 401 controls the Ironic conductor service 12 of the control node 1 to randomly select a bare metal node 2 as the main bare metal node from the at least two bare metal nodes 2, and selects one or more remaining bare metal nodes 2 as the backup bare metal node from the at least two bare metal nodes 2.

The communicating module 402 controls the control node to communicate with the main bare metal node and the backup bare metal node by a power control network 4, and controls the main bare metal node to turn on a power supply of the main bare metal node, to activate the operating system image file, and communicates with the main bare metal node by a business network 3.

In one embodiment, the communicating module 402 controls the Ironic conductor service 12 of the control node 1 to communicate with the power controller 22 of the main bare metal node and the backup bare metal node by the power control network 4, and controls the power controller 22 of the main bare metal node to turn on the power supply to make the agent service 21 of the main bare metal node activate the operating system image file. In one embodiment, the communicating module 402 controls the ionic conductor service 12 of the control node 1 to control the power controller 22 of the main bare metal node to turn on the power supply by the IPMI command.

In one embodiment, the communicating module 402 controls the DHCP agent service 11 to communicate with the agent service 21 of the main bare metal node by the business network 3. In detail, after the power supply of the main bare metal node is started, the agent service 21 of the main bare metal node sends a first request signal for requesting an IP address to the DHCP agent service 11 through the business network 3, and the first request signal includes a MAC address of the main bare metal node. The DHCP agent service 11 assigns a target IP address to the agent service 21 of the main bare metal node according to the first request signal, and records the MAC address of the main bare metal node. The DHCP agent service 11 communicates with the agent service 21 of the main bare metal node by the target IP address and the MAC address of the main bare metal node.

The detecting module 403 receives status information of the main bare metal node sent by the main bare metal node, and determines that the main bare metal node is working abnormally if and when information as to status is not received.

In one embodiment, the agent service 21 of the main bare metal node returns the state information to the control node 1 by a heartbeat mechanism, and the DHCP agent service 11 of the control node 1 receives the status information sent by the agent service 21 of the main bare metal node. When the operating system image file of the main bare metal node is operating abnormally or the business network 3 is disconnected, the DHCP agent service 11 does not receive the status information sent by the main bare metal node, and determines that the main bare metal node is operating abnormally when determining that the status information sent by the agent service 21 of the main bare metal node is not received.

The controlling module 404 switches off the power supply of the main bare metal node when determining that the main bare metal node is operating abnormally, and turns on the power supply of the backup bare metal node to make the backup bare metal node activate the operating system image file.

In one embodiment, the controlling module 404 controls the power supply controller 22 of the main bare metal node to switch off the power supply of the main bare metal node by the Ironic conductor service 12. In detail, the Ironic conductor service 12 controls the power controller 22 of the main bare metal node to switch off the power supply of the main bare metal node by the IPMI command.

In one embodiment, the controlling module 404 controls the power controller 22 of the backup bare metal node to turn on the power supply of the backup bare metal node by the ionic conductor service 12, and receives a second request signal for requesting the IP address by the DHCP service 12. The second request signal is sent by the agent service 21 of the backup bare metal node, and the allocated target IP address is sent according to the second request signal to the agent service 21 of the backup bare metal node. The MAC address of the backup bare metal node is recorded, to make the agent service 21 of the backup bare metal node communicate with the DHCP agent service 11 of the control node 1 by the business network 3. In one embodiment, the second request signal includes the MAC address of the backup bare metal node.

In one embodiment, the controlling module 404 sets the backup bare metal node which is in communication with the DHCP agent service 11 of the control node 1 as a new main bare metal node by the ionic conductor service 12, and selects an unused bare metal node from another backup bare metal node as the new backup bare metal node. The operating system image file is installed into the new backup bare metal node.

In the present disclosure, the control node switches off the power supply of the main bare metal node when determining that the main bare metal node is operating abnormally, and starts the power supply of the backup bare metal node to activate the operating system image file. Therefore, the services in the operating system image file can be continued on the backup bare metal node when the main bare metal node is operating abnormally, thus restoring execution of services.

Figure 4:
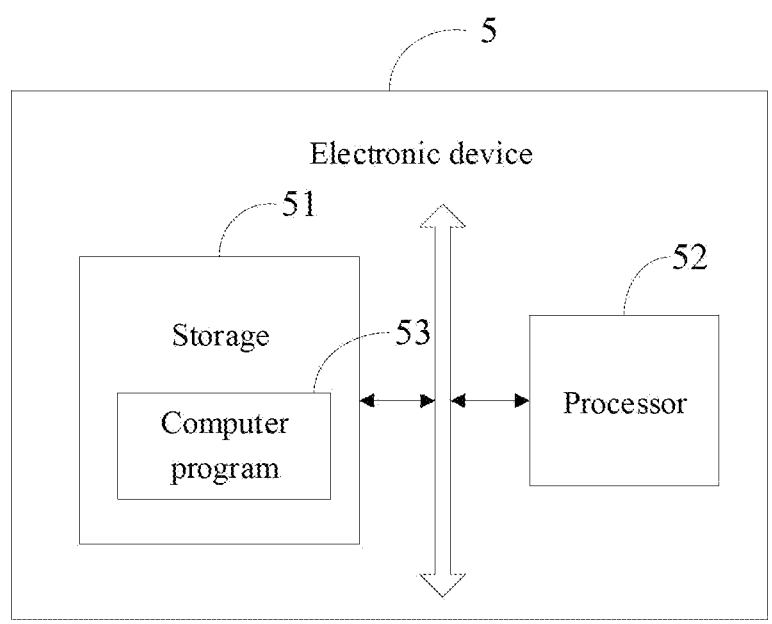
FIG. 4 is a block diagram of an embodiment of an electronic device utilized in the method of FIG. 1.

FIG. 4 illustrates the electronic device 5. The electronic device 5 includes a storage 51, a processor 52, and a computer program 53 stored in the storage 51 and executed by the processor 52. When the processor 52 executes the computer program 53, the blocks in the embodiment of the method, for example, blocks 11 to 14 as shown in FIG. 1, are applied. Alternatively, when the processor 52 executes the computer program 53, the functions of the modules in the embodiment of the high availability implementation system of bare metal based on OpenStack are implemented, for example, modules 401-405 shown in FIG. 3.

In one embodiment, the computer program 53 can be partitioned into one or more modules/units that are stored in the storage 51 and executed by the processor 52. The one or more modules/units may be a series of computer program instruction segments capable of performing a particular function, and the instruction segments describe the execution of the computer program 53 in the electronic device 5. For example, the computer program 53 can be divided into the setting module 401, the communicating module 402, the detecting module 403, and the controlling module 404 as shown in FIG. 3.

FIG. 4 shows only one example of the electronic device 5. There are no limitations of the electronic device 5, and other examples may include more or less components than those illustrated, or some components may be combined, or have a different arrangement. The components, such as the electronic device 5, may also include input devices, output devices, communication unit, network access devices, buses, and the like. 5

The processor 52 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 52 may be a microprocessor or the processor may be any conventional processor or the like. The processor 52 is the control center of the electronic device 5, and connects the entire electronic device 5 by using various interfaces and lines.

The storage 51 stores data and programs of the electronic device 5. For example, the storage 51 can store the implementation system based on OpenStack. In at least one exemplary embodiment, the storage 51 can include various types of non-transitory computer-readable storage mediums. For example, the storage 51 can be an internal storage system, such as a flash memory, a random access memory for temporary storage of information, and/or a read-only memory for permanent storage of information. The storage

51 can also be an external storage system, such as a hard disk, a storage card, or a data storage medium.

In one embodiment, the modules/units integrated in the electronic device 5 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for implementing high availability of bare metal node based on OpenStack comprising:
   setting, by a control node, one bare metal node of at least two bare metal nodes as a main bare metal node, and setting remaining bare metal nodes of the at least two bare metal nodes as a backup bare metal node, the main bare metal node and the backup bare metal node installing an operating system image file;
   controlling, by the control node, the main bare metal node to turn on a power supply of the main bare metal node, to make the main bare metal node activate the operating system image file, and communicating with the main bare metal node by a business network; wherein the control node communicates with the main bare metal node and the backup bare metal node by a power control network;
   receiving, by the control node, status information of the main bare metal node sent by the main bare metal node, and determining that the main bare metal node is working abnormally when failing to receive the status information; and
   switching off, by the control node, the power supply of the main bare metal node when determining that the main bare metal node is operating abnormally, and turning on the power supply of the backup bare metal node to make the backup bare metal node activate the operating system image file.

2. The method for implementing high availability of bare metal node based on OpenStack according to claim 1, wherein the control node comprises a Dynamic Host Configuration Protocol (DHCP) agent service and an Ironic conductor service, the bare metal node comprises an agent service and a power controller.

3. The method for implementing high availability of bare metal node based on OpenStack according to claim 2, further comprising:
   controlling, by the Ironic conductor service of the control node, the power controller of the main bare metal node to turn on the power supply to make the agent service of the main bare metal node activate the operating system image file, wherein the Ironic conductor service of the control node communicates with the power controller of the main bare metal node and the backup bare metal node by the power control network.

4. The method for implementing high availability of bare metal node based on OpenStack according to claim 2, wherein,
   the DHCP agent service communicates with the agent service of the main bare metal node by the business network.

5. The method for implementing high availability of bare metal node based on OpenStack according to claim 4, further comprising:
   assigning, by the DHCP agent service, a target IP address to the agent service of the main bare metal node according to a first request signal sent by the agent service of the main bare metal node and the first request signal comprising a MAC address of the main bare metal node, and recording the MAC address of the main bare metal node; wherein,
   the DHCP agent service communicates with the agent service of the main bare metal node by the target IP address and the MAC address of the main bare metal node.

6. The method for implementing high availability of bare metal node based on OpenStack according to claim 5, further comprising:
   controlling, by the Ironic conductor service, the power controller of the backup bare metal node to turn on the power supply of the backup bare metal node;
   receiving, by the DHCP service, a second request signal for requesting the IP address, wherein the second request signal is sent by the agent service of the backup bare metal node, and the second request signal includes the MAC address of the backup bare metal node;
   allocating, by the control node, the target IP address according to the second request signal to the agent service of the backup bare metal node;
   recording, by the control node, the MAC address of the backup bare metal node to make the agent service of the backup bare metal node communicates with the DHCP agent service of the control node by the business network.

7. The method for implementing high availability of bare metal node based on OpenStack according to claim 6, further comprising:
   setting, by the Ironic conductor service, a backup bare metal node communicated with the DHCP agent service of the control node as a new main bare metal node;
   selecting, by the control node, an unused bare metal node from anther backup bare metal as the new backup bare metal node; and
   injecting, by the control node, the operating system image file into the new backup bare metal node.

8. An electronic device comprising:
   a processor;
   a non-transitory storage medium coupled to the processor and configured to store a plurality of instructions, which causes the processor to:

control a control node to set one bare metal node of at least two bare metal nodes as a main bare metal node, and set remaining bare metal nodes of the at least two bare metal nodes as a backup bare metal node, wherein the main bare metal node and the backup bare metal node installs an operating system image file;

control the control node to communicate with the main bare metal node and the backup bare metal node by a power control network, and control the main bare metal node to turn on a power supply of the main bare metal node, to make the main bare metal node activate the operating system image file, and communicate with the main bare metal node by a business network;

control the control node to receive status information of the main bare metal node sent by the main bare metal node, and determine that the main bare metal node is working abnormally when failing to receive the status information; and control the control node to switch off the power supply of the main bare metal node when determining that the main bare metal node is operating abnormally, and turn on the power supply of the backup bare metal node to make the backup bare metal node activate the operating system image file.

9. The electronic device according to claim 8, wherein the control node comprises a Dynamic Host Configuration Protocol (DHCP) agent service and an Ironic conductor service, the bare metal node comprises an agent service and a power controller.

10. The electronic device according to claim 9, wherein the plurality of instructions is further configured to cause the processor to:

control the Ironic conductor service of the control node to communicate with the power controller of the main bare metal node and the backup bare metal node by the power control network, and control the power controller of the main bare metal node to turn on the power supply to make the agent service of the main bare metal node activate the operating system image file.

11. The electronic device according to claim 9, wherein the plurality of instructions is further configured to cause the processor to:

control the DHCP agent service to communicate with the agent service of the main bare metal node by the business network.

12. The electronic device according to claim 11, wherein the plurality of instructions is further configured to cause the processor to:

control the DHCP agent service to assign a target IP address to the agent service of the main bare metal node according to a first request signal sent by the agent service of the main bare metal node and the first request signal comprising a MAC address of the main bare metal node, and record the MAC address of the main bare metal node; and control the DHCP agent service to communicate with the agent service of the main bare metal node by the target IP address and the MAC address of the main bare metal node.

13. The electronic device according to claim 12, wherein the plurality of instructions is further configured to cause the processor to:

control the control node controlling the power controller of the backup bare metal node to turn on the power supply of the backup bare metal node by the Ironic conductor service;

receive a second request signal for requesting the IP address by the DHCP service, wherein the second request signal is sent by the agent service of the backup bare metal node, and the second request signal includes the MAC address of the backup bare metal node;

allocate the target IP address according to the second request signal to the agent service of the backup bare metal node;

record the MAC address of the backup bare metal node to make the agent service of the backup bare metal node communicates with the DHCP agent service of the control node by the business network.

14. The electronic device according to claim 13, wherein the plurality of instructions is further configured to cause the processor to:

control the control node to set a backup bare metal node communicated with the DHCP agent service of the control node as a new main bare metal node by the Ironic conductor service, and select an unused bare metal node from anther backup bare metal as the new backup bare metal node and inject the operating system image file into the new backup bare metal node.

* * * * *